No. 767,773. PATENTED AUG. 16, 1904.
W. STANLEY.
POWER TRANSMISSION.
APPLICATION FILED NOV. 30, 1903.
NO MODEL.
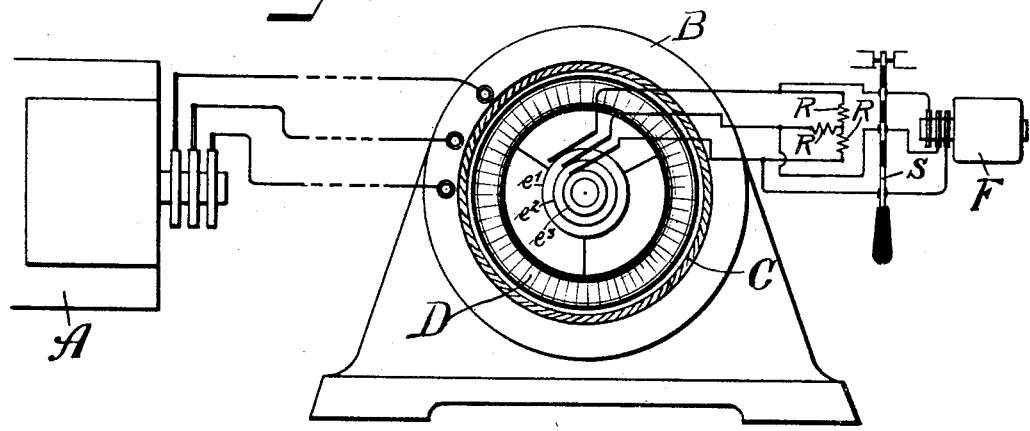
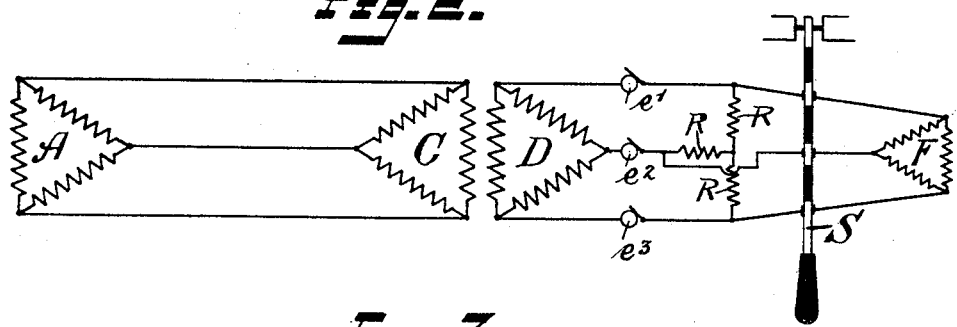
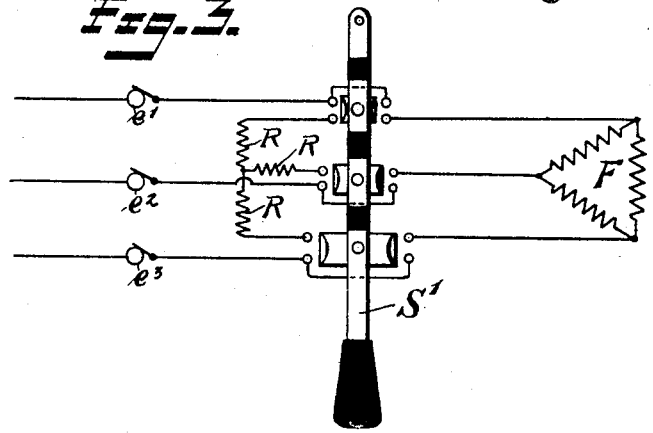
Witnesses
Inventor
WILLIAM STANLEY
By his Attorney No. 767,773.

Patented August 16, 1904.

UNITED STATES PATENT OFFICE.

WILLIAM STANLEY, OF GREAT BARRINGTON, MASSACHUSETTS.

POWER TRANSMISSION.

SPECIFICATION forming part of Letters Patent No. 767,773, dated August 16, 1904.

Application filed November 30, 1903. Serial No. 183,157. (No model.)

*To all whom it may concern:*

Be it known that I, WILLIAM STANLEY, a citizen of the United States, residing at Great Barrington, Berkshire county, Massachusetts, have invented certain new and useful Improvements in Power Transmission, of which the following is a full, clear, and exact description.

My invention relates to improvements in power transmission, and has for its object to provide a system of power transmission in which an induction-motor is made to run at a substantially constant speed relatively to the main generator of the system.

As is well known, the induction-motor has many great advantages on account of its self-starting capacity, it being possible to start such a motor under load. It is, however, at many times desirable to have the speed substantially constant relatively to the main generator, an end which an induction-motor as at present operated is unable to accomplish. By my invention, however, I am able to obtain this constant speed in a simple and effective manner.

In embodying my invention I make use of a generator of the ordinary type—for instance, a three-phase generator—and an induction-motor of the ordinary type adapted to said generator. I, however, modify this motor so that I am able, when desired, to impress upon the rotor a rotating field traveling or progressing in the same direction as the direction of rotation. This I accomplish by the use of an auxiliary exciter, which can be connected to or disconnected from the induced circuits.

The following is a description of my invention, reference being had to the accompanying drawings, in which—

Figure 1 shows diagrammatically a system embodying my invention. Fig. 2 shows a diagram of suitable windings. Fig. 3 shows a modification.

Referring more particularly to the drawings, A represents a generator of electricity which it is desired to convert into power at some distant point.

B represents an induction-motor having, as represented in Fig. 2, a field-winding C of the "Delta" type and an armature-winding D of the Delta type. This armature-winding is connected, by means of contact-rings $e' e^2 e^3$ and brushes bearing thereon, with the ordinary starting resistances R R R.

F is a three-phase exciter for supplying currents to the induced windings of said motor. It can be connected to and disconnected therefrom by the switch S. When said switch S is closed, the exciter is connected to the rotor circuits between the resistances R R R and the rings $e' e^2 e^3$. The exciter F when in operation is caused to rotate at such a speed as to give off currents which shall impress upon the rotor of the motor a rotating field traveling or progressing in the same direction as the direction of rotation of the rotor at a speed equal to or greater than the normal slip or falling behind of the rotor. Thus, for instance, if the generator A supplies a current of sixty alternations and the ordinary slip of the motor B equals two alternations, the motor would run at a frequency of fifty-eight. If when so running the rotor-circuit be supplied from the exciter F with currents of two alternations, so as to impress upon the rotor a rotating field traveling or progressing in the same direction as the direction of rotation of the rotor, then such a field will travel synchronously with the stator-field and will cause the motor to assume the characteristics of a synchronous motor—namely, it will maintain a definite speed of revolution equal to sixty alternations (the applied frequency) minus two alternations, (the exciter frequency.) In this manner I may obtain the starting-torque characteristics of a non-synchronous motor and the running characteristics (constant speed) of the synchronous type of motor.

The resistances R R R are the ordinary starting resistances of an induction-motor and are cut out when the low-frequency exciter-current is applied. In Fig. 3 I have shown a switch S' for accomplishing this.

In the operation of the apparatus the motor is speeded up as an induction-motor to a speed such that it will equal at least synchronous speed minus the rate of rotation of the magnetic field impressed by the exciter. The exciter is then connected up so as to impress this field. This results in maintaining the speed constant at a rate determined by the field produced by the exciter.

My invention permits of various modifications, and of course it is immaterial whether the motor is constructed so as to have its stator supplied with the main generator-currents and its rotor supplied with the exciter-currents, or vice versa.

The subject-matter disclosed but not claimed in this application is claimed in an application filed by me July 19, 1904, Serial No. 217,171.

What I claim is—

1. In a system of power transmission the combination of a main multiphase generator, a motor having multiphase windings on stator and rotor, a local low-frequency multiphase exciter, one set of motor-windings being adapted to be supplied with low-frequency currents by the local exciter and the other set adapted to be supplied by currents of normal frequency from said main generator.

2. In a system of power transmission the combination of a multiphase generator, an induction-motor connected thereto and located at a distance therefrom, said motor having multiphase induced windings, and a local multiphase exciter supplying currents to said induced windings.

3. In a system of power transmission the combination of a multiphase generator, an induction-motor connected thereto and located at a distance therefrom, said motor having multiphase induced windings, starting resistances, and a local multiphase exciter to supply current to said windings.

4. In a system of power transmission the combination of a multiphase alternating-current generator, a multiphase induction-motor located at a distance therefrom and connected thereto having closed-circuited induced windings, and means for impressing upon the induced windings of said motor multiphase alternating currents producing a field rotating in the same direction as the rotation of said rotor and at a speed at least equal to the ordinary slip.

5. In a system of power transmission the combination of a multiphase alternating-current generator, a multiphase induction-motor located at a distance therefrom and connected thereto having closed-circuited induced windings, means for impressing upon the induced windings of said motor multiphase alternating currents producing a field rotating in the same direction as the rotation of said rotor and at a speed at least equal to the normal slip, and a switch for connecting and disconnecting said means to and from said closed induced windings.

WILLIAM STANLEY.

Witnesses:
E. HEITMANN,
HERBERT M. SMITH.